United States Patent
Zack

(10) Patent No.: US 10,823,554 B2
(45) Date of Patent: Nov. 3, 2020

(54) WHEEL CLAMP ALIGNMENT APPARATUS

(71) Applicants: Bosch Automotive Service Solutions, Inc., Warren, MI (US); Robert Bosch GmbH, Stuttgart (DE)

(72) Inventor: Steven Zack, Essex, CT (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 136 days.

(21) Appl. No.: 16/145,902

(22) Filed: Sep. 28, 2018

(65) Prior Publication Data

US 2019/0101384 A1    Apr. 4, 2019

Related U.S. Application Data

(60) Provisional application No. 62/565,428, filed on Sep. 29, 2017.

(51) Int. Cl.
| | | |
|---|---|---|
| *G01B 11/275* | (2006.01) | |
| *G01S 7/497* | (2006.01) | |
| *G01B 11/26* | (2006.01) | |
| *G01S 17/931* | (2020.01) | |

(52) U.S. Cl.
CPC .......... *G01B 11/2755* (2013.01); *G01B 11/26* (2013.01); *G01S 7/4972* (2013.01); *G01S 17/931* (2020.01); *G01B 2210/12* (2013.01)

(58) Field of Classification Search
CPC .................................................. G01B 11/275
USPC ..................................................... 33/203.18
See application file for complete search history.

(56) References Cited

U.S. PATENT DOCUMENTS

| | | | |
|---|---|---|---|
| 4,962,664 A | 10/1990 | Hirano et al. | |
| 5,052,111 A * | 10/1991 | Carter .................... | G01B 5/255 33/203.18 |
| 6,282,799 B1 * | 9/2001 | Warkotsch ............. | G01B 5/255 33/203.18 |
| 6,483,577 B2 * | 11/2002 | Stieff ................. | G01B 11/2755 33/203.12 |
| 7,150,105 B1 * | 12/2006 | Battaglia ................ | G01B 5/255 33/203.18 |
| 7,578,066 B1 * | 8/2009 | Pellegrino .............. | G01B 5/255 248/220.21 |
| 7,710,555 B2 | 5/2010 | Hoenke et al. | |
| 8,104,185 B2 | 1/2012 | Gray et al. | |
| 8,565,975 B2 | 10/2013 | Buerkle et al. | |
| 8,838,323 B2 | 9/2014 | Matsunaga | |
| 9,134,125 B2 | 9/2015 | Gray et al. | |
| 9,279,670 B2 | 3/2016 | Schommer et al. | |
| 2002/0056204 A1 * | 5/2002 | Corghi .................. | G01M 1/045 33/550 |

(Continued)

FOREIGN PATENT DOCUMENTS

| | | |
|---|---|---|
| DE | 102007027138 A1 | 12/2008 |
| DE | 102016110830 A1 | 12/2016 |

*Primary Examiner* — George B Bennett
(74) *Attorney, Agent, or Firm* — David Kovacek; Maginot, Moore & Beck LLP

(57) ABSTRACT

An optical sensor calibration apparatus in the form of a wheel clamp. The wheel clamp apparatus is configured to determine a center point of a wheel of a vehicle, and to provide a measurement reference with respect to the center point. The measurement reference may be used to position other apparatuses in an optical sensor calibration system configured to calibrate an optical sensor of the vehicle.

14 Claims, 4 Drawing Sheets

(56) References Cited

U.S. PATENT DOCUMENTS

| | | | | |
|---|---|---|---|---|
| 2002/0170195 A1* | 11/2002 | Corghi | .................. | G01B 5/255 |
| | | | | 33/520 |
| 2006/0090356 A1* | 5/2006 | Stieff | ................ | G01B 11/2755 |
| | | | | 33/288 |
| 2008/0209744 A1* | 9/2008 | Stieff | ................ | G01B 11/2755 |
| | | | | 33/203.18 |
| 2011/0146089 A1* | 6/2011 | Gray | ..................... | G01B 5/255 |
| | | | | 33/288 |
| 2014/0115906 A1* | 5/2014 | Pruitt | .................... | G01B 5/255 |
| | | | | 33/203.18 |
| 2016/0195388 A1* | 7/2016 | D'Agostino | ....... | G01B 11/2755 |
| | | | | 33/228 |
| 2017/0097230 A1 | 4/2017 | Rogers et al. | | |
| 2017/0124784 A1 | 5/2017 | Wittmann et al. | | |

* cited by examiner

US 10,823,554 B2

WHEEL CLAMP ALIGNMENT APPARATUS

TECHNICAL FIELD

This disclosure relates to the calibration of optical sensors of a vehicle and the calibration of optical sensors disposed within a vehicle. In particular, the disclosure herein relates to the alignment of calibration systems in order to provide a proper calibration of the optical sensors.

BACKGROUND

Modern vehicles may comprise optical sensor systems for purposes of collision detection, navigation, driver assistance, autonomous driving, or other functions. The sensors in these optical sensor systems must be initially calibrated to ensure accurate operation, and may require additional calibration after repair or in the course of regular vehicle maintenance.

Optical sensor calibration is performed using sensor calibration apparatuses comprising reflective surfaces placed at predetermined angles and positions with respect to the sensors of the vehicle. Because the sensors may be disposed within the body of the vehicle, it is often advantageous to determine the angle and position of sensor calibration apparatuses based upon measurements made with respect to external features of the vehicle. In particular, the wheels of the vehicle are desirable external features because the wheels influence the steering of the vehicle during operation. Measurements based upon the wheels of the vehicle are therefore advantageous when calibrating sensors utilized for functions such as driver assistance or autonomous driving functions.

Existing calibration systems that utilize the wheels of a vehicle as a reference point to position calibration apparatuses rely upon large, complicated rigs. Such systems may involve a set of stanchions having leveling features, requiring that the entire vehicle be positioned on top of the stanchions. Other such systems may include a set of unwieldly, complicated rigs to properly provide a reference point with respect to the wheels. Such systems may require multiple technicians to properly install or remove from the vehicle after calibration is completed.

Therefore, it is desirable to implement a wheel-based alignment apparatus of a vehicle optical sensor calibration system that is light-weight, easy to install and remove from the vehicle, and simple to configure such that it provides an accurate measurement reference.

SUMMARY

One aspect of this disclosure is directed to an embodiment of a wheel clamp apparatus configured to provide a measurement reference to an optical sensor calibration system. The wheel clamp apparatus is configured to provide a measurement reference with respect to the center of a wheel of a vehicle, thus permitting accurate placement of a calibration apparatus to properly calibrate the vehicle's sensors. The wheel clamp apparatus may include a number of clamp arms operably coupled to a mid-point member, the mid-point member extending along a center axis of the wheel clamp apparatus. The wheel clamp apparatus may additionally comprise a number of angle measurement instruments and adjustment mechanisms to ensure that the wheel clamp apparatus is properly positioned and oriented when coupled to the wheel. The wheel clamp apparatus may further comprise a center-seeking assembly operable to be in alignment with the center of the wheel, and also to provide a measurement reference with respect to the center of the wheel.

In some embodiments of the aspect disclosed herein, the wheel clamp apparatus may comprise a spring-tension mechanism operable to pull the clamp arms taut to the wheel.

Another aspect of this disclosure is directed to an optical sensor calibration system for calibrating the optical sensors of a vehicle, the system including a wheel clamp apparatus configured to provide a measurement reference with respect to the center of a wheel of the vehicle.

Another aspect of this disclosure is directed to a method of preparing a wheel clamp apparatus for use with an optical sensor calibration system, the wheel clamp being operable to provide a measurement reference used to properly align and position other elements of the optical sensor calibration system with respect to a wheel of a vehicle to which the wheel clamp apparatus is coupled.

The above aspects of this disclosure and other aspects will be explained in greater detail below with reference to the attached drawings.

BRIEF DESCRIPTION OF THE DRAWINGS

FIG. 3 is an alternate view of a wheel clamp apparatus coupled to a.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
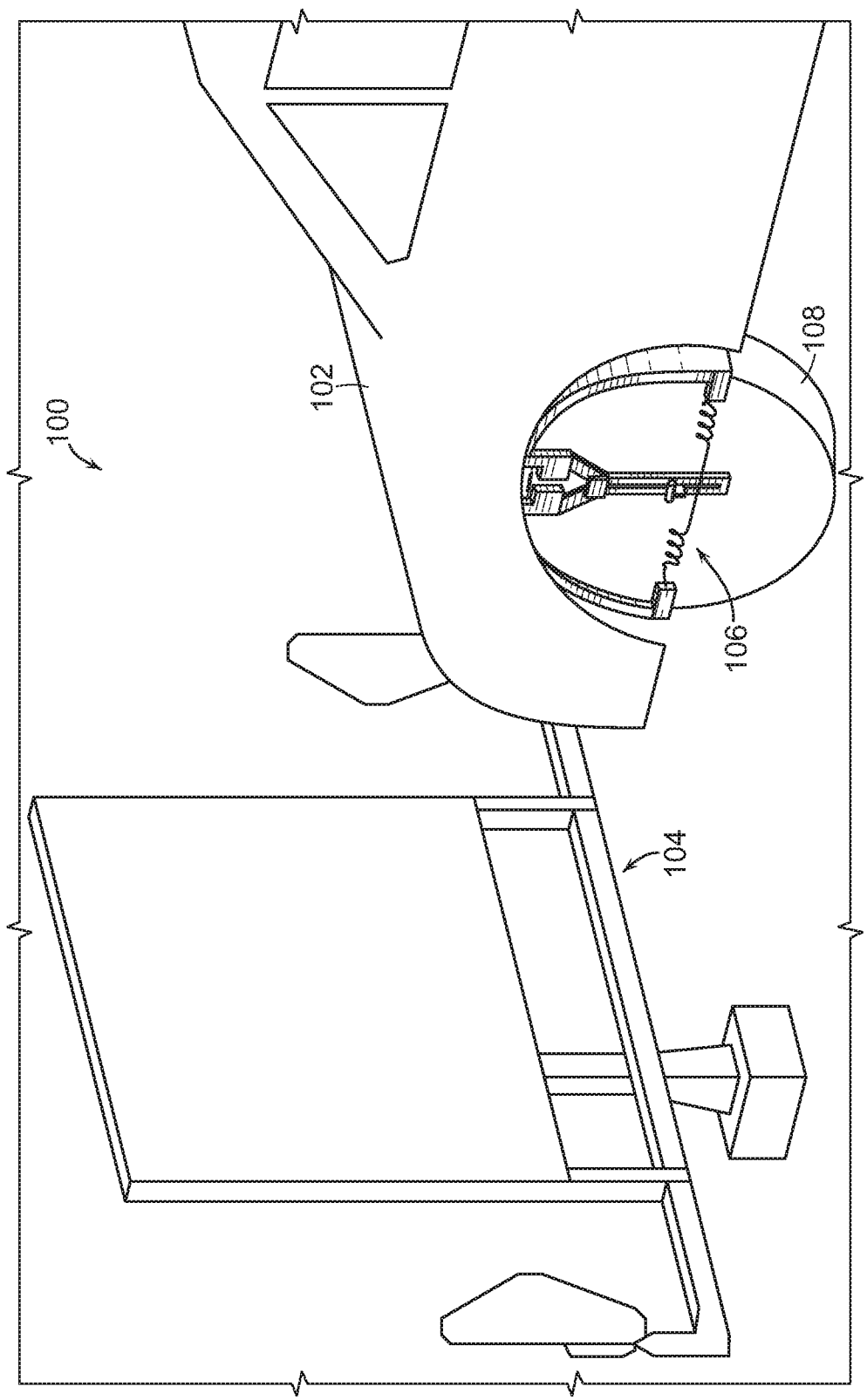
FIG. 1 is a perspective view of a sensor calibration system having a wheel clamp apparatus.

FIG. 1 shows an embodiment of an optical sensor calibration system 100 during a calibration of the sensors of a vehicle 102. Optical sensor calibration system 100 comprises a primary reflective body 104 and a wheel clamp 106, coupled to a wheel 108 of vehicle 102. During a calibration, the sensors of vehicle 102 emit a known signal toward primary reflective body 104. The signal is then reflected back toward vehicle 102 and measured by the vehicle sensors (not shown). Proper placement and angling of the primary reflective body 104 during calibration is needed for a proper calibration measurement, and thus the primary reflective body 104 is positioned during calibration within specified tolerances determined by the automotive manufacturer or sensor supply company based on the type of vehicle sensor, calibration needs of such vehicle sensor, and location of the vehicle sensor on the vehicle 102. The sensors of vehicle 102 may be disposed within the body or chassis of vehicle 102, making direct measurements from the sensors impractical. Instead, the position of the primary reflective body 104 may be determined based upon measurements referencing external features of vehicle 102. One possible reference point is the center of the wheels in alignment with the rotational of each wheel. Wheel clamp 106 is operable to determine the center point of a wheel 108 to be used as a reference in determining the position of primary reflective body 104. Though FIG. 1 shows only one particular wheel 108 of vehicle 102, other wheels may be utilized to position primary reflective body 104 with respect to the sensors of vehicle 102.

Figure 2:
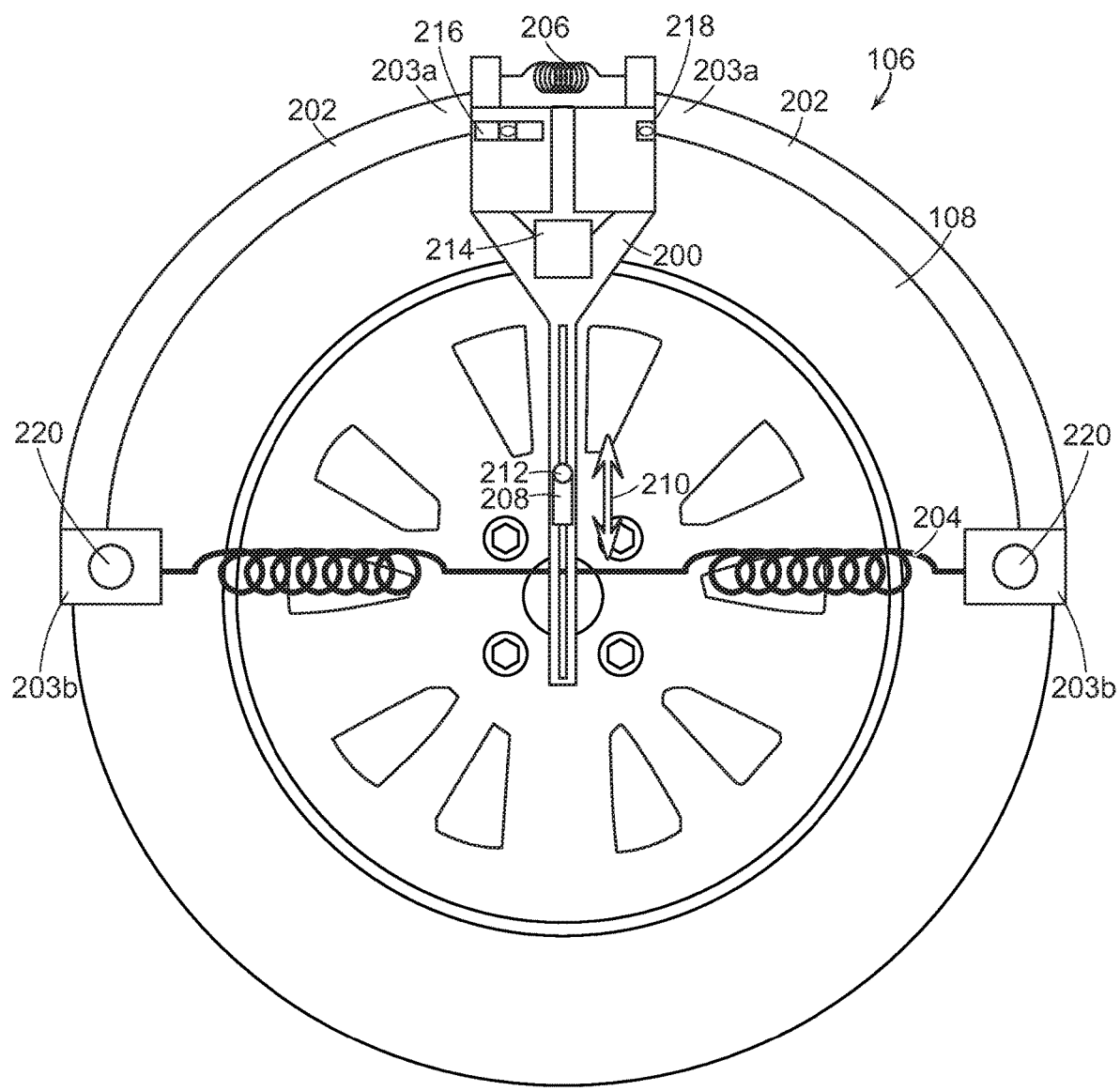
FIG. 2 is a close-up view of a wheel clamp apparatus coupled to a wheel.

FIG. 2 is an illustration of wheel clamp 106 when coupled to wheel 108. Wheel clamp 106 comprises a mid-point member 200 having a number of clamp arms 202 extending therefrom. In the depicted embodiment, wheel clamp 106 comprises two clamp arms 202, but other embodiments may comprise a different number of clamp arms. Clamp arms 202 are configured such that they comprise a proximal end 203a coupled to mid-point member 200 and a distal end 203b that moves freely in at least one degree of motion. In the depicted embodiment, the distal end 203a of each clamp arm 202 is configure to pivot about mid-point member 200 in a "clamshell" motion. When the clamp arms 202 are in an open position, they are operable fit over the wheel 108 by surrounding a portion of the perimeter of wheel 108. When the clamp arms 202 are in a coupled position, as shown, they are operable fit over the wheel 108 by surrounding a portion of the perimeter of wheel 108 and contacting a portion of the wheel 108. In the depicted embodiment, the "clamshell" motion is achieved by flexion of clamp arms 202. In the depicted embodiment, midpoint member 200 is affixed to each of clamp arms 202 in a y-shape, and thus is also capable of a degree of flexion to achieve, for example, 1/2" of displacement, but other embodiments may comprise other configurations without deviating from the teachings herein. In the depicted embodiment, clamp arms 202 and mid-point member 200 are sufficiently flexible such that wheel clamp 106 may flex to a degree sufficient to surround a wheel having a total diameter between 20-28 inches. Wheel clamp 106 may accommodate other diameters without deviating from the teachings disclosed herein. In the depicted embodiment, the total diameter of wheel 108 comprises the total diameter of a wheel-tire assembly, but other embodiments of wheel 108 may be utilized without deviating from the teachings herein. In some embodiments, the pivot motion of clamp arms 202 may be achieved with a hinge, joint, or other alternative configuration known to one of ordinary skill in the art without deviating from the teachings disclosed herein. In the depicted embodiment, clamp arms 202 are composed of aluminum, but other embodiments may have compositions comprising plastic, fiberglass, carbon fiber, metals, or any combination thereof known to one of ordinary skill without deviating from the teachings herein.

Clamp arms 202 are held taut against a tread surface of wheel 108 by a compression spring 204. Compression spring 204 is operable to inhibit the wheel clamp 106 from shifting position while serving as a measurement reference. Wheel clamp 106 may be configured with an optional hinge spring 206, which is operable to counter-effect the tension provided by compression spring 204 to reduce the force necessary to expand clamp arms 202 for coupling to wheel 108. Hinge spring 206 is an advantageous feature for technicians working alone because it makes the coupling wheel clamp 106 to wheel 108 less difficult for a single person. When the clamp arms 202 are considered to be in a closed position, they are in a position in which the compression spring has pulled the clamp arms 202 to their most inward travel position, or the compressions spring 202 has traveled to a point of no tension, or in the case of a wheel clamp 106 with a hinge spring 206, to a point where the two springs are in equilibrium with each other.

Because wheel clamp 106 is held in place against the tread surface of circular wheel 108, and because compression spring 204 is the mechanism with which clamp arms 202 are held taut, mid-point member 200 is naturally disposed along a diameter of wheel 108, such that mid-point member 200 intersects with the axis of rotation running through the center point of wheel 108, hereinafter referred to as the center axis 207 (see FIG. 3). Mid-point member 200 is sufficiently long to intersect with the center axis of wheels having a range of diameters. Thus the center point of wheel 108 is expected to be aligned to an arbitrary point along mid-point member 200. Wheel clamp 106 therefore further comprises a center-seeking assembly 208 configured to be adjustably-positioned in a direction 210 along the mid-point member 200 such that it aligns with the center axis 207 of wheel 108. Center-seeking assembly 208 may be coupled to mid-point member 200 in such a way that its position along mid-point member 200 in direction 210 is adjustable and repeatable. In the depicted embodiment, center-seeking assembly 208 comprises a two-channel slider, but other embodiments may comprise a sliding screw set, threaded collar, belt mechanism, or other alternatives known to one of ordinary skill without deviating from the teachings herein. Center-seeking assembly 208 may comprise a number of detents or may comprise a smooth adjustment mechanism.

Center-seeking assembly 208 further comprises an alignment indicator 212, which is operable to determine the alignment of center-seeking assembly 208 with respect to wheel 108. During calibration, the center-seeking assembly 208 is adjusted along mid-point member 200 until alignment indicator 212 indicates that center-seeking assembly 208 is in alignment with the center of wheel 108. After this alignment is achieved, center-seeking assembly 208 is in alignment with the center point of wheel 108, and may be used as a measurement reference with respect to the center point of wheel 108. In the depicted embodiment, alignment indicator 212 is a point laser, but other embodiments may comprise a line-level, cross-line laser, extension rod, a view-scope through center-seeking assembly 208, or any other alternative known to one of ordinary skill without deviating from the teachings herein. In the depicted embodiment, the point laser of alignment indicator 212 is battery-operated, but other embodiments of alignment indicator 212 may be powered using solar cells or a hard-wired connection to an external energy source. In other embodiments wherein alignment indicator 212 does not require electrical power, an electrical power source may not be present. In the depicted embodiment, compression spring 204 is configured such that it is not coiled within proximity of mid-point member 200. Such a configuration is advantageous to maintain clear visual line between alignment indicator 212 and the center point of wheel 108. Other embodiments may comprise alternative configurations of compression spring 204, such as multiple compression springs which couple clamp arms 202 to mid-point member 200, one or more compression springs coupled at different points of mid-point member (such as nearer to proximal ends of clamp arms 202), a single compression spring 204 configured to comprise coils throughout the length thereof, or any other equivalent alternatives recognized by one of ordinary skill in the art without deviating from the teachings herein.

Center-seeking assembly 208 may further be positioned using an electric motor 214 configured to adjust the position of center-seeking assembly 208 along midpoint member 200 in direction 210. In the depicted embodiment, electric motor 214 is battery-operated, but other embodiments may comprise a hard-wired connection to an external power source. In embodiments without electric motor 214, an electrical power source may not be present.

Electric motor 214 may be controlled using manual controls disposed thereon. In some embodiments, electric motor 214 may be controlled remotely using a remote controller device (not shown). A remote controller device may be configured to control electric motor 214 using hard-wired or wireless communication. In one embodiment, the remote controller device may comprise a handheld processing device in wireless communication with electric motor 214 and having a graphical user interface operable to control electric motor 214. In other embodiments, the remote controller device may comprise a dedicated electronic device, a tablet computing device, a general-purpose computer, a general-purpose processing device, a distributed network of processing devices, a processor disposed within vehicle 102, a wearable computing device, or any other alternative equivalent recognized by one of ordinary skill in the art.

The alignment of wheel clamp 106 is an important consideration in aligning components of an optical sensor calibration system. To provide accuracy and repeatability in the measurements, wheel clamp 106 comprises a number of positional indicators operable to indicate when wheel clamp 106 is properly aligned to determine the center point of wheel 108. A horizontal-angle indicator 216 indicates when mid-point member is properly oriented with respect to a horizontal plane. Clamp arms 202 may be loosened from the tread surface of wheel 108 and the entire of wheel clamp 106 may be rotated with respect to the perimeter of wheel 108 until the horizontal-angle indicator 216 indicates proper alignment, with mid-point member 200 oriented in a vertical direction. Vertical orientation of mid-point member 200 ensures that when center-seeking assembly 208 is placed in alignment with the center point of wheel 108, the measurement reference thereof is not skewed with respect to a horizontal axis. In the depicted embodiment, horizontal-angle indicator 216 comprises a spirit level, but other embodiments may comprise a digital level, accelerometer, or any other alternative equivalent recognized by one of ordinary skill in the art without deviating from the teachings herein.

Wheel clamp 106 additionally comprises a camber indicator 218 operable to indicate the camber of wheel clamp 106, or the angle of wheel clamp 106 with respect to a vertical axis along the face of wheel 108. Wheel clamp 106 is first coupled to wheel 108 and adjusted with respect to the horizontal angle. Once horizontal-angle indicator 216 indicates proper alignment of mid-point member 200 in a vertical orientation, the camber of wheel clamp 106 may be adjusted with respect to the wheel 108 using a number of leveling mechanisms 220. Leveling mechanisms 220 are operable to adjust the camber of wheel clamp 106 until camber indicator 218 indicates that camber of wheel clamp 106 is in a neutral, vertical orientation. In the depicted embodiment, level mechanisms 220 comprise level screws, but other embodiments may comprise alternative configurations known to one of ordinary skill in the art without deviating from the teachings herein. Vertical-alignment of wheel clamp 106 ensures that when center-seeking assembly 208 is placed in alignment with the center point of wheel 108, the measurements made in reference thereof are not skewed with respect to a left/right angle in relation to the tread of wheel 108. In the depicted embodiment, these measurements are based upon wheel 108 being configured such that the tread surface is perpendicular to the tracking direction of vehicle 102 when vehicle 102 is moving in a forward direction. Other embodiments may utilize alternative configurations for wheel 108 with respect to vehicle 102. In the depicted embodiment, camber indicator 218 comprises a spirit level, but other embodiments may comprise a digital level, accelerometer, or any other alternative equivalent recognized by one of ordinary skill in the art without deviating from the teachings herein.

Figure 3:
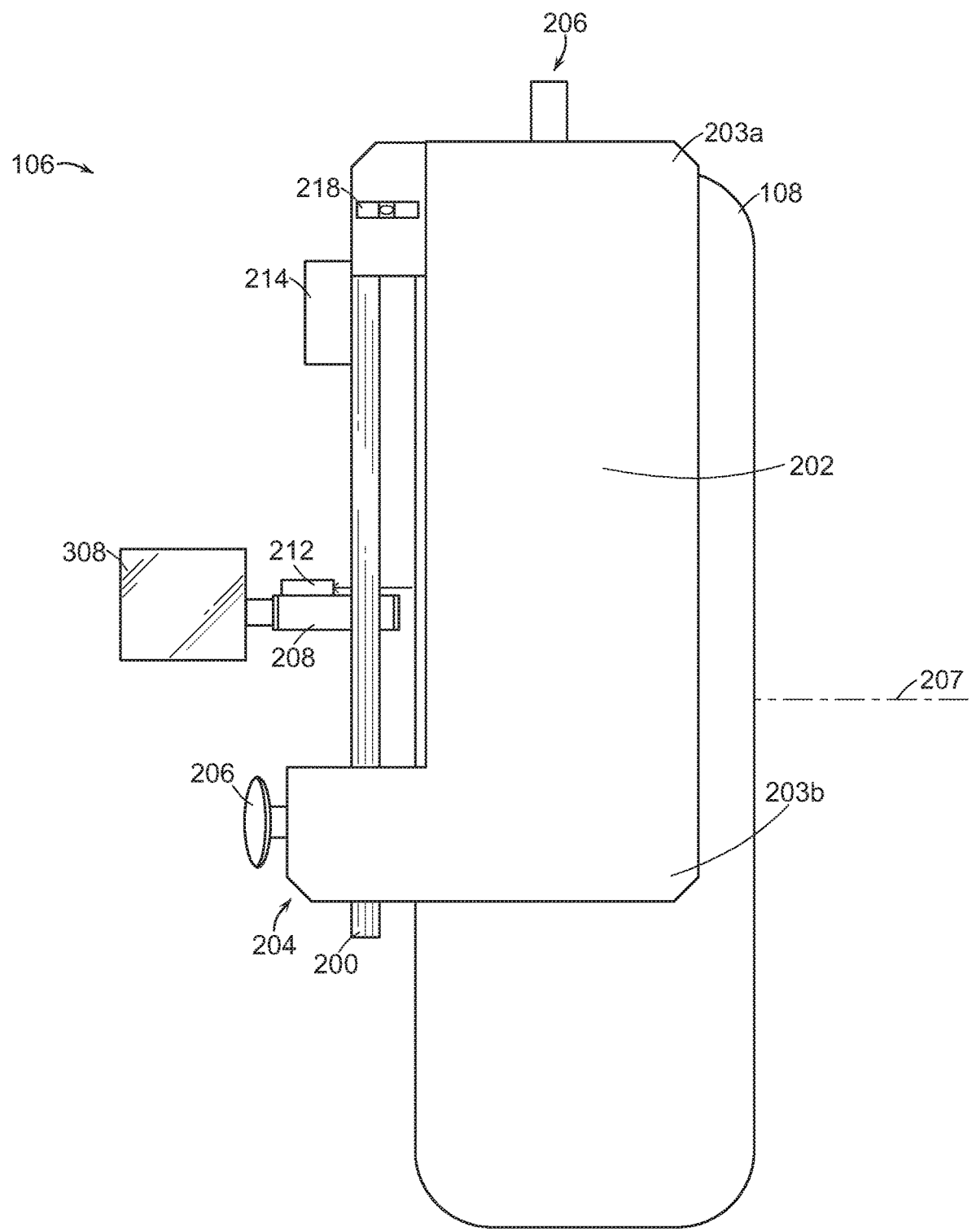

FIG. 3 provides a side-view illustration of an embodiment of wheel clamp 106 when coupled to wheel 108 in the manner depicted in FIG. 2. In the depicted embodiment, clamp arms 202 comprise a thin shell configuration, but other embodiments may comprise alternative configurations without deviating from the teachings herein. In the depicted embodiment, center-seeking assembly 208 further comprises a measurement reference 308. In the depicted embodiment, measurement reference 308 may be detachably coupled to center-seeking assembly 208, and only is coupled to center-seeking assembly 208 after center-seeking assembly 208 has been properly aligned with the center point of wheel 108. In some embodiments, measurement reference 308 may be permanently affixed to center-seeking assembly 208. In the depicted embodiment, measurement reference 308 comprises a reflective target operable to provide a reflection surface suitable for use with an optical range-finder. Other embodiments may comprise other configurations of measurement reference 308, such as a mirrored surface, reference marking on center-assembly 208, or any alternative configuration known to one of ordinary skill in the art without deviating from the teachings herein. In some embodiments, reference measurements made to position components of the optical sensor calibration system may be made with measurement reference 308 as a starting point. In such embodiments, measurement reference 308 may instead comprise a measurement instrument, such as an optical range-finder, a tape measure, a fixed-length rod, a fixed-length cable, or any other alternative equivalent known to one of ordinary skill in the art without deviating from the teachings herein. In some embodiments, alignment indicator 212 may be operable to provide measurements as well as alignment indication, and in such embodiments alignment indicator 212 may be operable to pivot about center-seeking assembly 208 such that measurements taken therefrom are along an axis perpendicular to the tracking direction of the wheels. Advantageously, such embodiments do not require an additional measurement reference 308, and may instead additionally utilize alignment indicator 212 to perform the functions of measurement reference 308.

Figure 4:
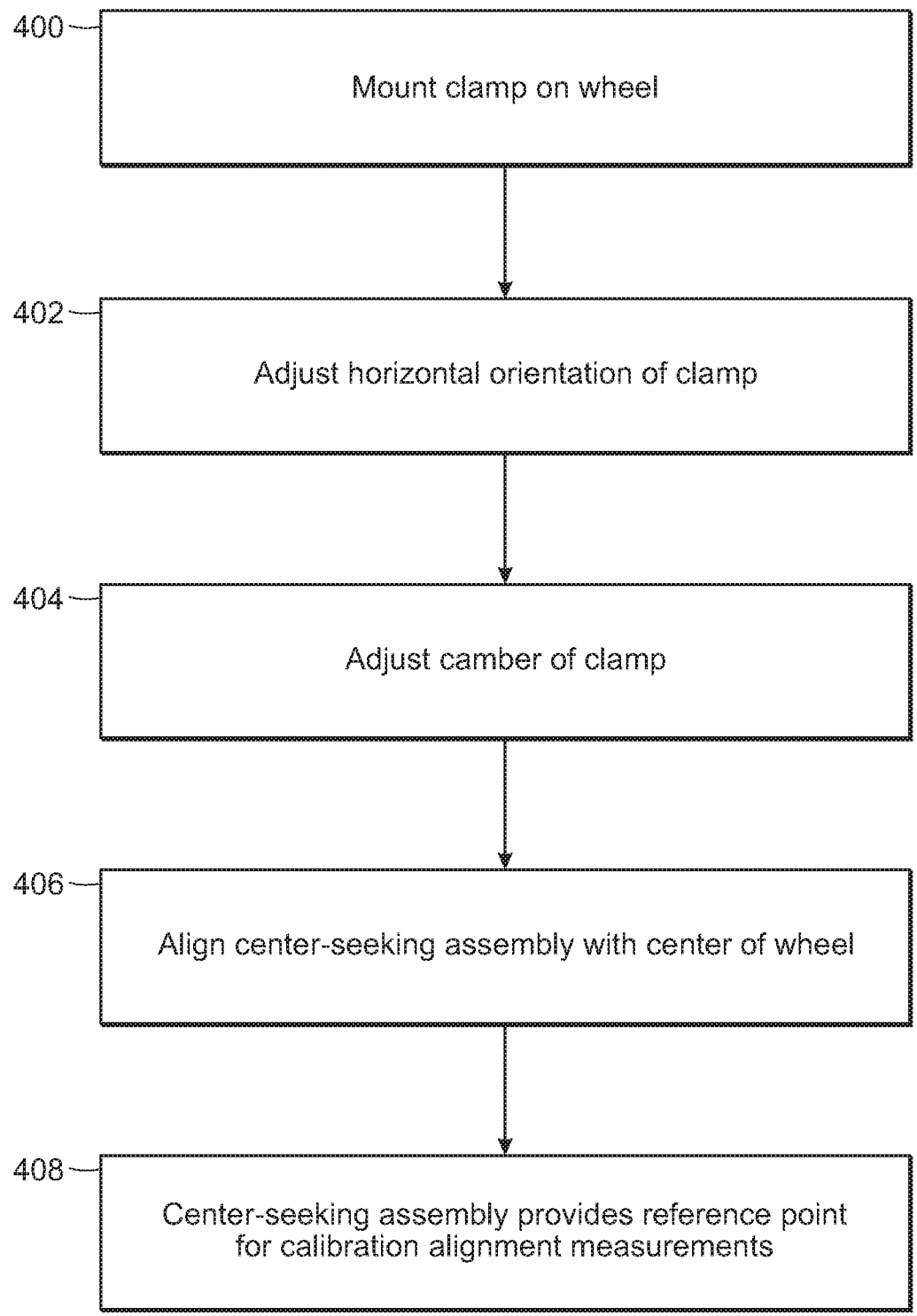
FIG. 4 is a flowchart illustrating a method of configuring a wheel clamp apparatus according to an embodiment of the teachings herein to act as part of a vehicle sensor calibration system.

FIG. 4 provides the steps of a method of configuring wheel clamp 106 for use to position other components of an optical sensor calibration system. After vehicle 102 has been positioned such that one of its wheels 108 is placed in a forward-tracking direction, the wheel clamp 106 can be mounted onto wheel 108 at step 400 by expanding clamp arms 202 and allowing compression spring 204 to pull clamp arms 202 taut against the tread surface of wheel 108. At step 402, the orientation of wheel clamp 106 is adjusted until horizontal-angle indicator 216 indicates that mid-point member 200 is in a vertical orientation. At step 404, leveling mechanisms 220 are utilized to adjust the camber of wheel clamp 106 until camber indicator 218 indicates that wheel clamp 106 is in a vertical orientation. With mid-point member 200 now in a vertical orientation with respect to both a horizontal axis and the face of wheel 108, center-seeking assembly 208 may be aligned with the center point of wheel 108. At step 406, center-seeking assembly 208 is then positioned along mid-point member 200 in direction 210 until alignment indicator 212 indicates that center-seeking assembly 208 is aligned with the center point of wheel 108. At step 408, measurement reference 308 may be utilized as a reference point in measurements to properly align other components of the optical sensor calibration system.

FIG. 4 represents one method of use to configure wheel clamp 106 for use as a measurement reference point. Other embodiments may comprise other steps (e.g., pivoting alignment indicator 212 in embodiments wherein it is additionally utilized to perform the functions of measurement reference 308 as disclosed above) or alternative sequences of these steps to achieve the same results without deviating from the teachings herein.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A wheel clamp apparatus for a vehicle optical sensor calibration system, the wheel clamp comprising:
   a mid-point member;
   a number of clamp arms pivotably extending from the mid-point member, the clamp arms operable to couple to a wheel of a vehicle by at least partially covering a portion of the wheel, wherein the clamp arms are adjustable using a spring-loaded mechanism, the spring-loaded mechanism comprising a number of tension springs coupled to the number of clamp arms and operable to pull the clamp arms against a tread surface of the wheel such that a portion of the mid-point member extends through the axis of the wheel;
   a number of angle measurement instruments affixed to the mid-point member and configured to measure the angle of the mid-point member with respect to at least a horizontal plane allowing for the mid-point member to be placed in a substantially-vertical orientation at the latitudinal midpoint of the wheel; and
   a center-seeking assembly having a calibration system component, the center-seeking assembly coupled along the mid-point member and operable to align with a center point of the wheel of a vehicle.

2. The wheel clamp apparatus of claim 1, wherein each of the number of clamp arms further comprises a leveling adjustment screw, each leveling adjustment screw operable to adjust the camber of the respective clamp arm with respect to the wheel of the vehicle.

3. The wheel clamp apparatus of claim 1, wherein the calibration system component comprises a laser measurement device operable to indicate the alignment of the center-seeking assembly with respect to the wheel.

4. The wheel clamp apparatus of claim 3, wherein the laser measurement device is further operable to pivot such that it is measures the distance of an object disposed to the front of the vehicle from the center of the wheel of the vehicle.

5. The alignment wheel clamp of claim 3, wherein the laser measurement device is further operable to pivot such that it measures the distance of an object disposed to the rear of the vehicle from the center of the wheel of the vehicle.

6. The alignment wheel clamp of claim 1, wherein the calibration system component comprises an alignment target, the alignment target configured to provide a measurement reference between the center of the wheel of a vehicle and a reflective calibration plate of the calibration system.

7. The alignment wheel clamp of claim 6, wherein the alignment target further comprises a reflective surface.

8. The alignment wheel clamp of claim 1, further comprising an electric motor configured to adjust the position of the center-seeking instrument with respect to the mid-point member.

9. The alignment wheel clamp of claim 8, wherein the electric motor is operable via a remote control device.

10. The alignment wheel clamp of claim 9, wherein the remote control device is a mobile computing device having a graphical user interface.

11. A sensor calibration system configured to be positioned at one or more particular positions in relation to a sensor of a vehicle during calibration comprising:
    a primary reflective body comprising a number of reflective surfaces; and
    a number of alignment wheel clamps configured to be detachably coupled around a top portion of a wheel of a vehicle, the number of alignment wheel clamps each having a number of clamp arms configured to couple to the wheel by covering at least a portion of the wheel and a center-seeking assembly operable to determine the center point of the wheel and further operable to provide a measurement reference to the center of the wheel of the vehicle with respect to the primary reflective body in relation to the sensor of the vehicle.

12. The sensor calibration system of claim 11, wherein the number of alignment wheel clamps are operable to detachably couple to a wheel of the vehicle using a spring-tension mechanism.

13. The sensor calibration system of claim 11, wherein the number of alignment wheel clamps comprise an electric motor operable for use in the determination of the center point of the wheel of the vehicle.

14. A method of configuring an alignment wheel clamp as a component of a sensor calibration system, the alignment wheel clamp having a number of clamp arms, a mid-point member disposed at a midpoint between the number of clamp extremities using a spring-tension mechanism, a center-seeking assembly operable to be adjustably positioned along the mid-point member, and a number of angle instruments configured to indicate the angle of the mid-point member with respect to at least a horizontal plane and the camber of the alignment wheel clamp with respect to a vertical plane, the method comprising:
    mounting the alignment wheel clamp to a wheel of a vehicle such that the number of clamp arms rest against the tread surface of the wheel of a vehicle and covers at least a portion of the wheel;
    adjusting the position of the alignment wheel clamp while mounted to the wheel of a vehicle such that the horizontal-angle instrument indicates that the alignment wheel clamp is horizontally level and that the camber of the alignment wheel clamp is neutral;
    adjusting the position of the center-seeking assembly along the mid-point member such that the center-seeking assembly is horizontally aligned with a center point of the wheel of a vehicle; and
    utilizing the adjusted position of the center-seeking assembly and the alignment wheel clamp as a measurement reference in positioning components of a sensor calibration system.

* * * * *